Nov. 24, 1925.
F. W. HALL
1,562,550
REVIVIFYING FULLER'S EARTH
Filed July 28, 1923
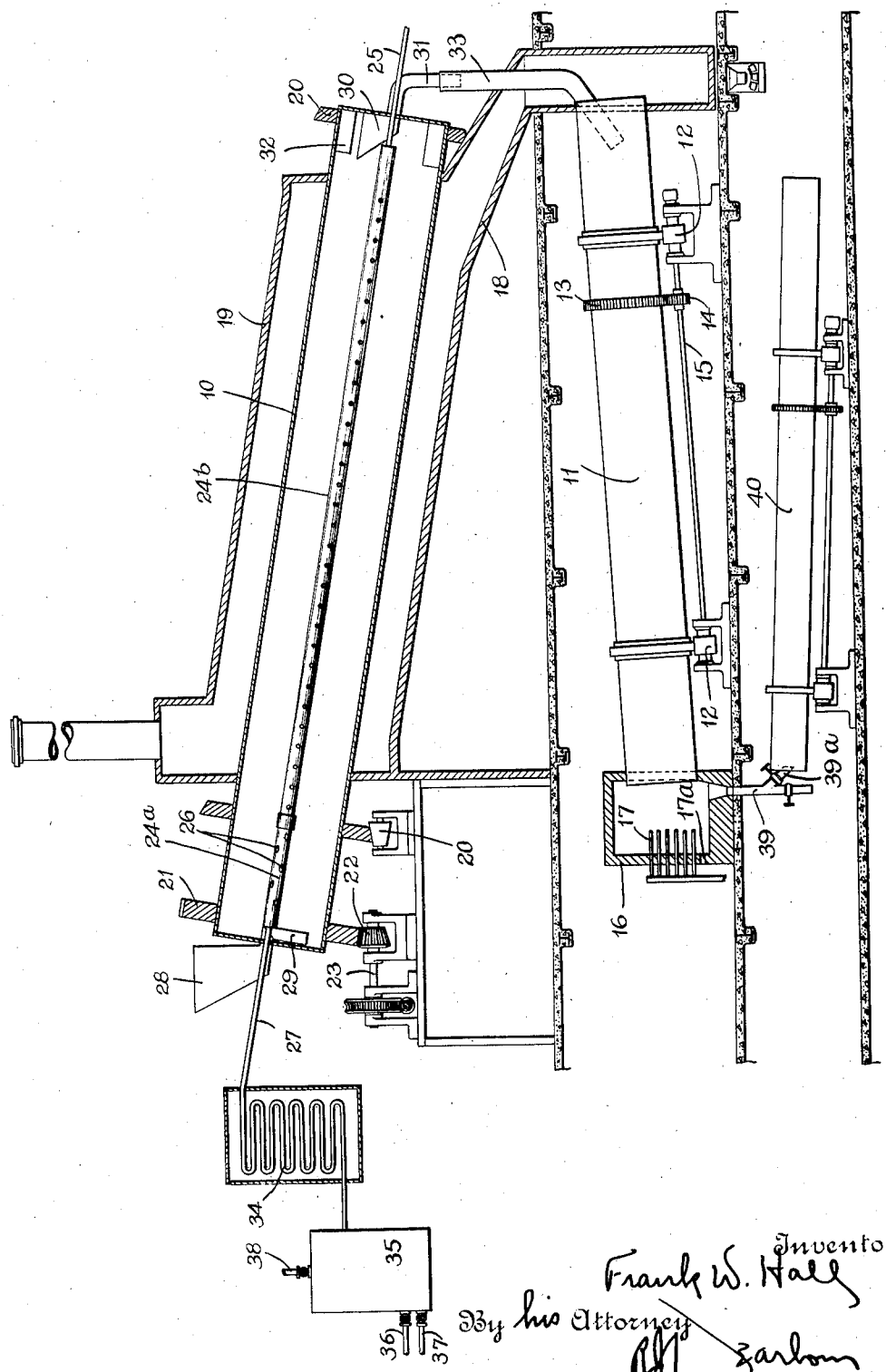
Inventor
Frank W. Hall
By his Attorney Patented Nov. 24, 1925.

1,562,550

UNITED STATES PATENT OFFICE.

FRANK W. HALL, OF PORT ARTHUR, TEXAS, ASSIGNOR TO THE TEXAS COMPANY, OF NEW YORK, N. Y., A CORPORATION OF TEXAS.

REVIVIFYING FULLER'S EARTH.

Application filed July 28, 1923. Serial No. 654,302.

*To all whom it may concern:*

Be it known that I, FRANK W. HALL, a citizen of the United States of America, and a resident of Port Arthur, county of Jefferson, and State of Texas, have invented certain new and useful Improvements in Revivifying Fuller's Earth, of which the following is a specification.

This invention relates to the treatment of fuller's earth or other equivalent decolorizing or purifying material that has been used in the refining of hydrocarbon oils and contemplates a process of removing adsorbed coloring material or other occluded matter from the pores of the clay so as to effect a regeneration of the adsorbent qualities of the clay.

In the mineral oil industry fuller's earth is commonly used in filtering processes for the purpose of decolorizing and purifying the oil. After the clay has been thus used for a time it loses its adsorbent properties. For the purpose of rendering the clay suitable for re-use it is common practice to treat the spent clay for removal of the oil, as by washing it with gasoline or naphtha, and finally burning the clay in a rotary kiln. After the clay has been thus treated it has been considered suitable for re-use. Each time, however, that the clay is treated in this way its adsorbent or decolorizing qualities are reduced and after it has been burned a few times it becomes so greatly deteriorated that it is practically worthless for employment in the usual filtering treatments.

I have found that the loss in the adsorptive qualities of the clay is due to the fact that in the burning operation only the more exposed portions of the coloring material become oxidized, a comparatively large portion being carbonized within the pores of the clay. The color material which is removed from hydrocarbon oils by filtration through adsorbent material is of an asphaltic or bituminous nature and the only way in which this material, held in the interior interstices of the clay, can be removed is by distilling through the pores to the surface. In the usual method of burning the clay, however, a large portion of the asphaltic or bituminous matter becomes carbonized and is thus retained within the pores. The result is that after a few treatments in this manner the pores of the fuller's earth become so choked with carbonized material that the adsorbent properties of the earth are destroyed. Prior to my invention it has been impossible to practice to remove all of the occluded bituminous or asphaltic material even by the application of high temperatures but in any case the use of relatively high temperature is precluded because if the fuller's earth be heated excessively fusion occurs thus destroying the cellular structure of the clay and ruining its adsorptive properties.

In accordance with my invention the adsorbent material is rejuvenated by being heated in the presence of a suitable carrier gas, such as steam. The application of heat in the presence of the carrier gas operates to distill the occluded matter through the pores of the adsorbent material thereby bringing to the surface bituminous matter held in the interior cells of the clay. In practicing the invention the spent material is subjected to the distilling action of the carrier gas after which it is subjected to heat under oxidizing conditions.

Among the objects of the invention may be mentioned the provision of a process capable of treating the spent material in a rapid, efficient and continuous manner so that the process may be practiced commercially. Various other objects, as well as the particular advantages of the invention, will become apparent from the following detailed description thereof:

The practice of the invention is not restricted to the use of any particular apparatus. However, as the invention is best described in detail by reference to apparatus suitable for employment therewith I have illustrated in the accompanying diagrammatic sectional elevation an apparatus capable of being used advantageously in the practice of the invention.

In the apparatus thus shown rotary retorts 10 and 11 are provided, one of the retorts being preferably positioned above the other. The upper retort 10 is adapted for the distilling treatment with the carrier gas and the lower retort 11 is intended for the oxidizing treatment. The retorts are preferably inclined and are arranged to be heated by any suitable means.

The retort 11 is supported on roller bearings 12 and is provided with a ring gear 13 which meshes with a pinion 14 on a shaft 15 to which power may be supplied by any suitable source. It is preferable to heat the retort 11 internally and thus the lower end of the retort communicates with a furnace 16 to which heat may be supplied by means of gas burners 17 or other suitable means. The furnace is provided with air inlet means 17ª.

The retort 10 may be conveniently heated by the waste combustion gases which pass from the retort 11, since the distilling operation may be carried on at a lower temperature than the oxidizing treatment. Thus the upper end of retort 11 may communicate with a flue 18 by which the heated gases are conveyed to a heating chamber 19 within which the retort 10 is mounted. The retort 10 is supported on roller bearings 20 and is equipped with a ring gear 21 which meshes with a pinion 22 on a shaft 23 to which power may be supplied by any suitable source.

A stationary pipe is arranged concentric with the rotary retort 10, being preferably formed of two portions closed to each other, such as a portion 24ª in the upper end of the retort and a portion 24ᵇ extending through the other portion of the retort. A pipe 25 communicates with the pipe 24ᵇ and serves to supply steam or other suitable carrier gas to the retort, the pipe 24ᵇ being perforated, as illustrated, in order that the carrier fluid may be discharged into the retort. The pipe 24ª is formed with openings 26 and communicates with a vapor line 27 to provide for the withdrawal of vapors and gases from the retort.

A charging hopper 28 is provided at the upper end of the retort for the purpose of admitting the fuller's earth or other spent adsorbent material which it is desired to revivify. As illustrated, the hopper is provided with a depending leg 29 within the retort by which the material is introduced thereinto. At the other end of the retort is a discharge hopper 30 which communicates with a discharge conduit 31 by which the adsorbent material is removed from the retort. The lower end of the retort is equipped with a plurality of lifting shelves 32 which serve to direct the solid material into the discharge hopper 30 as the retort rotates. The conduit 31 preferably communicates with a conduit 33 so that the material discharged from the retort 10 may be transferred to the retort 11.

The vapor line 27 extends to a condenser coil 34 and a receiver 35 is provided for collecting the condensate. The receiver is preferably provided with draw-off lines such as 36 and 37 for the removal of the oil and water, respectively, and with a gas outlet 38.

The furnace chamber 16 is provided with a conduit 39 by which the treated material discharged thereinto from the rotary retort 11 may be removed. The treated material may be discharged directly to suitable conveying mechanism by which it is transferred to storage bins or, if desired, it may first be passed through a branch line 39ª into a rotary cooler 40.

In the preferred manner of practicing the invention the fuller's earth or other adsorbent material that has been used in clarifying or decolorizing mineral oil may first be treated for the removal of the bulk of the oil contained in the material. Thus the spent clay may, before its introduction to the retort 10 or within the retort, be treated with a solvent of the oil, or with steam or by both solvents and steam so as to remove the bulk of the oil. If the bulk of the oil is not removed before the clay is introduced into the retort 10 the application of the heat and steam in this retort operates to first distill out the oil and on continuing the distillation, preferably at increased temperatures, the occluded asphaltic or bituminous matter is distilled. The process is preferably carried on in a substantially continuous manner, the clay to be regenerated being introduced into the hopper 28 at the upper end of the retort 10, passed downwardly through the retort 10, conveyed in a continuous stream to the retort 11 and finally passed through the cooler 40.

As the retort 10 is rotated the flue gases discharged from the rotary retort 11, or the other heating means that may be employed, operate to heat the contents of the retort and the stream of steam discharged into the mass of material in the retort 10 causes a distilling action whereby the bituminous material contained in the interior cells of the porous material is brought to the surface. As the clay gradually works its way to the lower end of the retort ample time is afforded for the heat and carrier medium to penetrate to the interior pores of the clay. Steam by reason of its high latent heat of vaporization is a very efficient agent in removing the occluded material from the interior pores. The steam may be superheated if desired. It is ordinarily unnecessary, however, to introduce the steam in superheated condition because the temperature in the retort 10 is sufficient to superheat the steam or at least to maintain it at such a temperature that the required distilling operation is effected.

As the retort is rotated the lifting shelves 32 operate to discharge the material which has thus been subjected to the action of the steam into the hopper 30 and the treated material is discharged into the conduit 31. If desired, this material may be at once removed from the apparatus. It will ordinarily be found, however, that while the steam treatment operates to bring the occluded bituminous matter from the interior pores into the more exposed cells of the clay it will not ordinarily completely remove the material thus brought to the surface. In order to completely revivify the material it is, therefore, conveyed to the rotary retort 11 wherein it is heated under oxidizing conditions. A quantity of air is admitted to the furnace 16 and retort 11 so that by reason of the heat applied to the mass in the retort the bituminous material may be burned and the clay thus completely regenerated.

The vaporous products formed in the retort 10 are drawn off through the vapor line 27 and conveyed to the condenser 34. The oil portion of the condensate collected in the receiver 35 is adapted for various uses. It may, for example, be used as fuel to produce some of the heat required in carrying on the process.

The invention is adapted for revivifying all grades of adsorbent material employed in refinery operations. Thus the process may be applied in treating spent fuller's earth of a relatively coarse mesh, such as is used in filtering oil by percolation, and it is also adapted for the treatment of the fine clay used in treating or filtering operations employing agitation and the use of a filter press and the like.

Obviously many modifications and variations of the invention, as hereinbefore set forth, may be made without departing from the spirit and scope thereof and, therefore, only such limitations should be imposed as are indicated in the appended claims.

What I claim is:

1. The process of treating spent adsorbent material used in refining mineral oils that comprises subjecting the material to the distilling action of a carrier gas and then heating the material in the presence of air.

2. The process of treating spent adsorbent material used in refining mineral oils that comprises distilling out occluded bituminous matter from said material with the aid of steam and then subjecting the material to further heating under oxidizing conditions.

3. The process of revivifying fuller's earth that comprises first subjecting the earth in a retort to the combined action of externally applied heat and internally applied steam and then subjecting the earth to internally applied heat in the presence of air.

4. The process of treating spent adsorbent material used in decolorizing mineral oils that comprises heating the material in the presence of steam to a temperature sufficient to drive off oil contained in the mass, then heating the mass at increased temperatures to distill out occluded color material and finally heating the mass under oxidizing conditions.

5. The process of treating spent adsorbent material used in refining mineral oils that comprises heating the material in the presence of steam to a temperature sufficient to distill occluded bituminous matter and then subjecting the material to a higher temperature in the presence of air.

6. The process of treating spent adsorbent material used in decolorizing mineral oils that comprises passing a stream of said material through a heating zone wherein it is subjected to the action of steam to distill out occluded material and then continuously passing said stream through another heating zone wherein the material is heated in the presence of air.

In witness whereof, I have hereunto set my hand this 10th day of July, 1923.

FRANK W. HALL.

DISCLAIMER.

1,562,550.—*Frank W. Hall*, Port Arthur, Tex. REVIVIFYING FULLER'S EARTH. Patent dated November 24, 1925. Disclaimer filed July 25, 1928, by the assignee, *The Texas Company*.

Your petitioner, therefore, hereby enters this disclaimer to the subject matter of each of the claims in said specification as follows, to wit:

"The process set forth in each of claims 1 to 6, inclusive, as applied to the treatment of materials having pores of ultramicroscopic size, such as silica gel and related artificial mineral gels, and highly activated charcoals."

[*Official Gazette August 7, 1928.*]